(12) United States Patent
Zonneveld et al.

(10) Patent No.: US 6,493,915 B2
(45) Date of Patent: Dec. 17, 2002

(54) METHOD OF INSTALLING A MOVABLE ROOF ASSEMBLY IN THE ROOF OF A VEHICLE

(75) Inventors: Eric Petrus Zonneveld, Heemskerk (NL); Frits Pieter De Vries, Heiloo (NL)

(73) Assignee: Vermeulen Hollandia Octrooien II B.V., Haarlem (NL)

( * ) Notice: Subject to any disclaimer, the term of this patent is extended or adjusted under 35 U.S.C. 154(b) by 0 days.

(21) Appl. No.: 09/435,809

(22) Filed: Nov. 8, 1999

(65) Prior Publication Data

US 2002/0000739 A1 Jan. 3, 2002

(30) Foreign Application Priority Data

Nov. 6, 1998 (NL) .............................................. 1010498

(51) Int. Cl.[7] .............................................. B23P 17/04
(52) U.S. Cl. ...................................... 29/401.1; 29/897.2
(58) Field of Search ........................... 296/215, 220.01, 296/216.03, 216.05; 29/897, 897.1, 897.2, 401.1, 402.08, 402.09, 402.11, 402.12, 402.14

(56) References Cited

U.S. PATENT DOCUMENTS

| 4,138,155 A | * | 2/1979 | Chrysler |
| 4,287,654 A | * | 9/1981 | Chrysler |
| 4,330,150 A | * | 5/1982 | Dunchock et al. |
| 4,332,416 A | * | 6/1982 | Lutz et al. |
| 4,821,394 A | * | 4/1989 | Martinez-vera |
| 5,029,937 A | * | 7/1991 | Yamamoto .................. 296/223 |
| 5,303,970 A | * | 4/1994 | Young et al. ............... 296/37.7 |
| 5,671,968 A | * | 9/1997 | Masuda et al. ...... 296/203.03 X |

FOREIGN PATENT DOCUMENTS

| DE | 38 02 380 | | 8/1988 | |
| DE | 4227400 | * | 2/1994 | ............ 296/216.05 |
| DE | 295 12 643 | | 11/1995 | |
| JP | 4627 | * | 1/1983 | ................. 296/215 |

* cited by examiner

Primary Examiner—S. Thomas Hughes
Assistant Examiner—T. Nguyen
(74) Attorney, Agent, or Firm—Nixon Peabody LLP; David S. Safran

(57) ABSTRACT

A method of installing a movable roof assembly in the roof of a vehicle, wherein the vehicle having an open roof construction including a top section with a roof opening and a sliding roof mounted on the roof opening, the sliding roof including a center bar positioned substantially across a mid region of the roof opening for increasing safety of occupants in the vehicle, the center bar being fixedly attached to a rigid body of the vehicle. The center bar is preferably accessible from the interior of the vehicle and is adapted to house at least one vehicle accessory such as roller sun blinds, storage compartments and/or light fittings.

13 Claims, 3 Drawing Sheets

METHOD OF INSTALLING A MOVABLE ROOF ASSEMBLY IN THE ROOF OF A VEHICLE

BACKGROUND OF THE INVENTION

1. Field of the Invention

The invention relates to a vehicle provided with an open roof construction that allows opening of the vehicle roof.

2. Description of Related Art

An increasing percentage of car buyers want a sliding roof with a large slide opening and/or a large glass surface.

For instance, the published German Patent Application 38 02 380 shows a vehicle roof having a large roof opening which can be covered by two roof panels positioned one behind the other. The rear panel can be removed after unlocking it and the front panel can first be tilted in the manner of a so-called spoiler roof such that front panel is first tilted so that the rear edge is raised, and then can be slid backwards.

The published German Utility Model 29 512 643 shows a vehicle having a spoiler roof consisting of two panels which are positioned one behind the other and are slidable in the longitudinal direction of the vehicle. The spoiler roof includes a means for pivoting the panels upwards into the ventilation position and for moving them in the opposite direction into the closed position.

These known constructions do not have a roof cross-member which greatly increases the safety of the occupants in the event of a collision. While it is true that such a roof cross-member fitted between the B-pillars of the body of a vehicle are known in conventional vehicles having a small roof opening, such roof cross-member would have to be removed if the abovementioned vehicle roof construction is to be used. However, such removal of a roof cross-member is not desirable since the sliding roof construction does not provide the same level of safety to the vehicle occupants as the roof cross-member.

SUMMARY OF THE INVENTION

The primary object of the present invention is to provide a vehicle with an open roof construction which improves the safety of the occupants over prior art vehicles having open roof constructions.

According to one embodiment of the present invention, the vehicle with an open roof construction includes a center bar which increases safety of the vehicle occupants and is adapted to be fitted with accessories for the vehicle. In this regard, the center bar is fixed to the body of the vehicle such as the vehicle's top section in the mid region of the roof opening. The center bar may also be accessible from the interior of the vehicle and can be provided with numerous vehicle accessories housed thereon.

The center bar can thus, replace the center cross-member which may be provided in standard vehicles, such cross-members being removed to provide a large open roof construction.

Preferably, the center bar may be fixed to the vehicle body using fixing brackets.

If the open roof construction is provided with a frame that delimits the edges of the roof opening, the ends of the center bar can alternatively be fixed to the frame.

The center bar can serve to house a wide variety of accessories, such as two roller sun blinds, one that can be moved forward from the center bar and one that can be moved to the rear from the center bar into the working position, storage compartments and light fittings.

Vents may be provided, as well as light fittings, at the rear edge of the rear panel.

Movement of the front panel can be implemented in various ways. Preferably, the front panel is adapted to slide over the rear panel following a lifting movement.

These and other objects, features and advantages of the present invention will become more apparent from the following detailed description of the preferred embodiments of the invention when viewed in conjunction with the accompanying drawings.

DETAILED DESCRIPTION OF THE INVENTION

Figure 1:
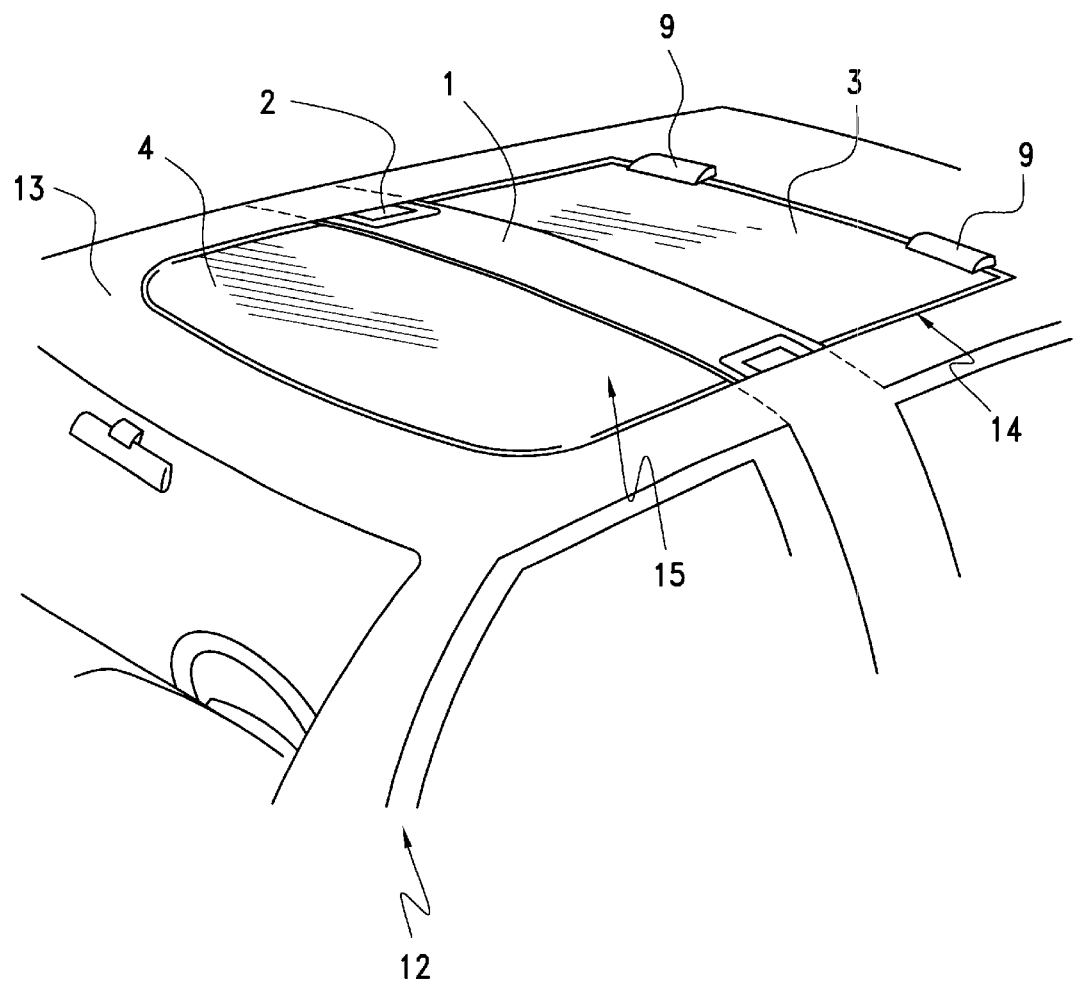
FIG. 1 shows a perspective view of a top section of a vehicle having an open roof construction according to one embodiment of the present invention where the sliding roof is in a completely closed position.

A vehicle 12 having an open roof construction in accordance with one embodiment of the present invention is shown in FIGS. 1 to 4. As can be seen, the vehicle 12 has an open roof construction that allows opening of the vehicle roof or top section 13 so that the vehicle interior is open to the outside of the vehicle12. The open roof construction includes a roof opening 14 in the top section 13 of the vehicle 12 which receives a sliding roof 15 having a robust, fixed center bar 1 which is fixed at two ends to a rigid body of the vehicle such as the top section 13. Preferably, the center bar 1 is fixed to the rigid body of the vehicle proximate to a pillar such as a "B" pillar or other rigidifying structure by means of brackets 2. As can be readily appreciated, the fixed center bar 1 greatly increases occupant safety, especially in the event of a vehicle accident. Of course, it should be appreciated that, if the open roof construction is provided with a frame (not shown) that delimits the edges of the roof opening 14, the ends of the center bar 1 can alternatively be fixed to the frame itself.

In the illustrated embodiment, a rear panel 3 is provided which is fixed by its front edge to the center bar 1 and is not movable. The rear panel 3 is preferably made of see through glass or other material which allows viewing outside the vehicle The rear edge of the rear panel 3 seals against a rear edge of either the roof opening 14 or against the sliding roof frame (not shown).

The front panel 4 is movable between an open and a closed position and is preferably made from glass or other see through material. Movement of this panel can be realized in various ways. In the illustrative embodiment, the front panel 4 is first raised into a position higher than the fixed rear panel 3 as shown in FIG. 2, and is then slid backwards over the fixed rear panel 3 as most clearly shown in FIG. 3.

As far as safety is concerned, the center bar 1 constitutes a replacement for the roof cross-member if such cross-member was previously present. That is, by replacing the center cross-member which may be provided in standard vehicles traversing the roof with the center bar 1, a large open roof construction can be provided. As FIG. 4 clearly shows, the center bar 1 can also be used for housing numerous vehicle accessories such as two sun blinds 5 and 6, one sun blind which moves forward from the center bar 1 and one sun blind which moves backwards from the center bar 1 into positions for blocking the sun from the occupants.

Furthermore, storage compartments (not shown), light fitting 8, switches for controlling the sun blinds (not shown) and other vehicle accessories can optionally be provided or housed on the center bar 1.

Figure 2:
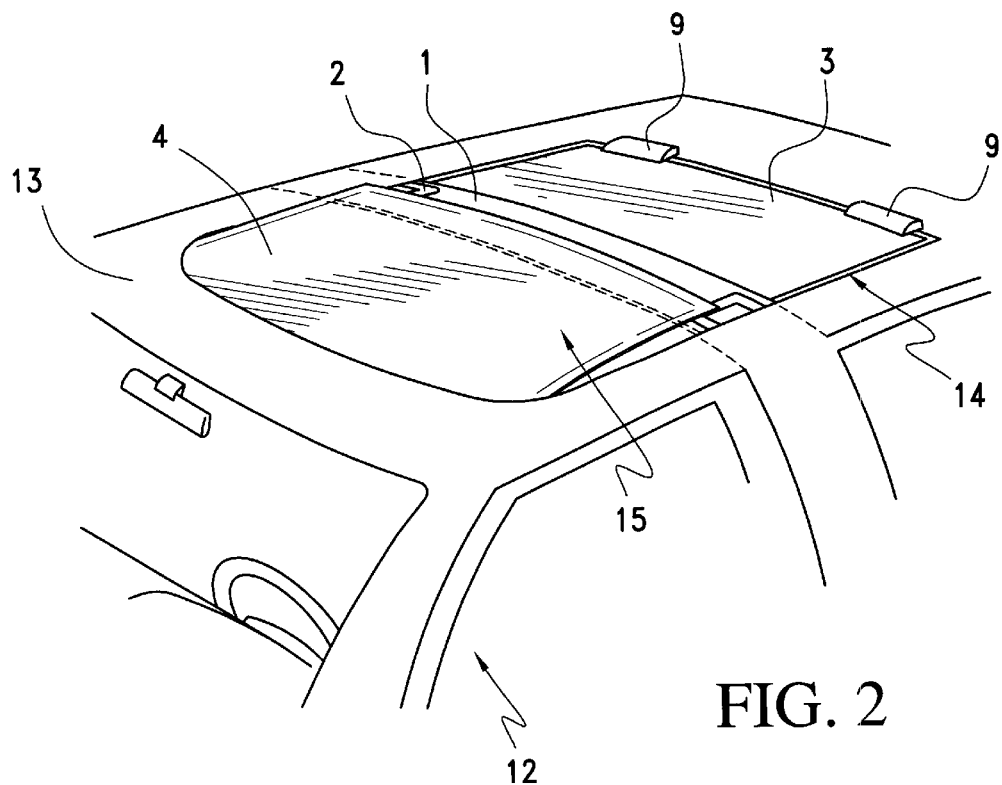
FIG. 2 shows a perspective view of a top section of a vehicle having an open roof construction of FIG. 1 where the front panel is raised.
Figure 3:
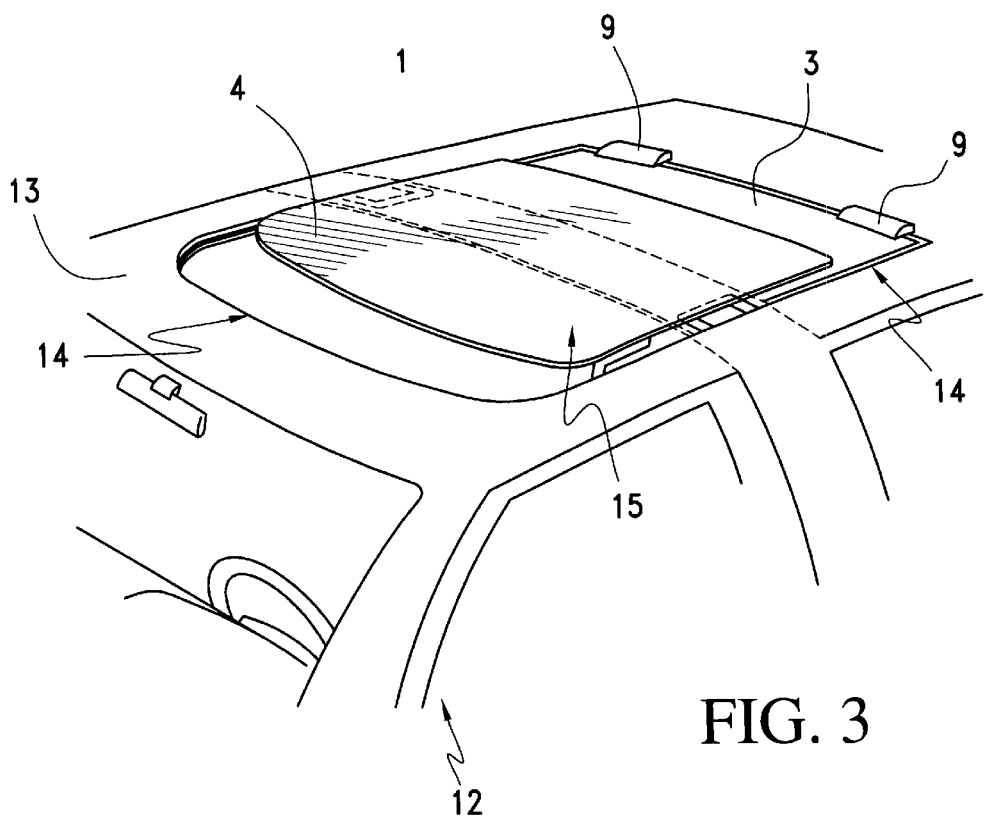
FIG. 3 shows a perspective view of a top section of a vehicle having an open roof construction of FIG. 2 where the front panel is slid backwards over the rear panel.
Figure 4:
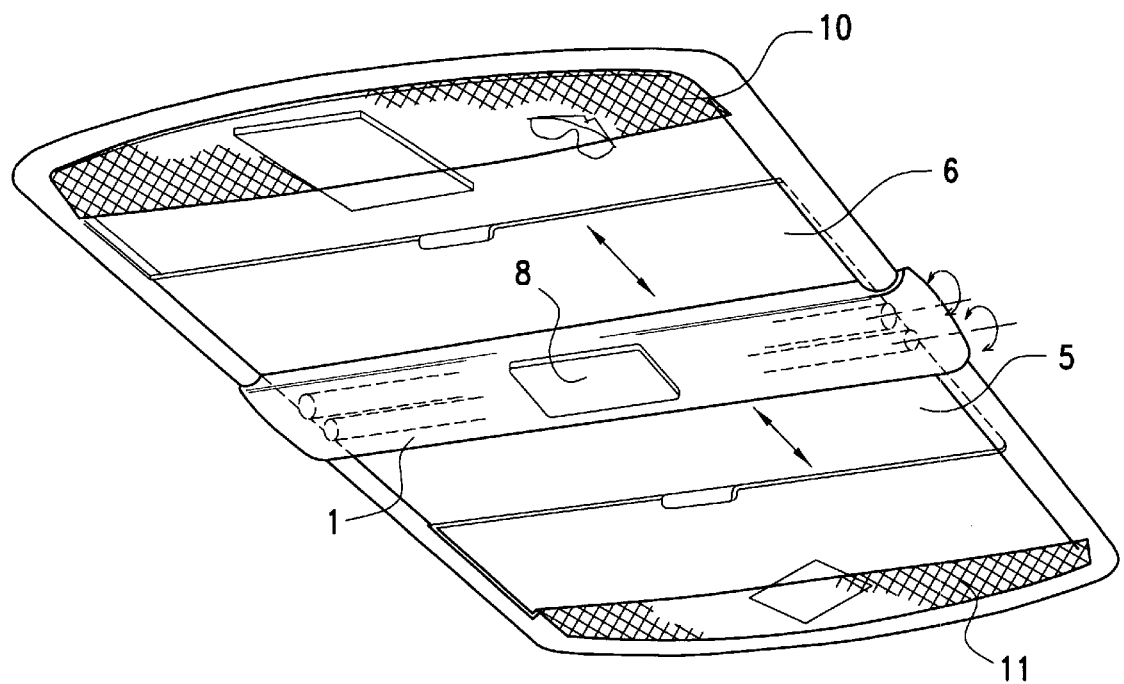
FIG. 4 shows a perspective view of the lower face of the sliding roof as viewed from a vehicle occupant.

Vents 9, as shown in FIGS. 1 to 3, may be provided to improve the discharge of air. In addition, accessories such as light fittings (not shown), storage nets 10, etc., may be provided at the rear edge of the sliding roof frame (not shown). Other accessories, such as a storage net 11, may also be fitted at the front edge of the frame of the sliding roof.

The present invention is not restricted to a vehicle provided with a sliding roof construction having two glass panels positioned one behind the other as discussed above. The present invention may also be used for other open roof constructions having a large opening in the roof. The essential feature of the present invention is that a center bar is fixed to the body of the vehicle in the mid region of the roof opening, the center bar being viewable from inside the vehicle and may be used for the providing accessories.

While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

What is claimed is:

1. A method of installing a replacement center bar of a movable roof assembly in a roof of a vehicle, said method comprising:

forming an open portion in the roof of the vehicle, the open portion being traversed by a roof cross-member;

removing the roof cross-member of the open portion; and replacing the roof cross-member with the replacement center bar by attaching the replacement center bar to a rigid body of the roof at substantially a mid region traversing the open portion.

2. A method as recited in claim 1, wherein the mid region of the open portion in the roof is proximate a rigidifying pillar of the vehicle.

3. A method as recited in claim 1, wherein the replacement center bar is accessible from an interior of the vehicle and houses at least one accessory.

4. A method as recited in claim 1, wherein said attaching step comprises attaching brackets to the mid region of the open portion and to the replacement center bar.

5. A method as recited in claim 1, wherein the rigid body includes a frame that defines edges of the open portion in the roof and wherein said attaching step comprises attaching said replacement center bar to said frame.

6. A method as recited in claim 1, wherein the movable roof assembly comprises a front glass panel and a rear glass panel positioned behind the front glass panel.

7. A method as recited in claim 6, wherein the replacement center bar houses a front roller sun blind and a rear roller sun blind, the front roller sun blind being adapted to unroll forward from the replacement center bar to cover the front glass panel and the rear roller sun blind being adapted to unroll rearward from the replacement center bar to cover the rear glass panel.

8. A method as recited in claim 1, wherein the replacement center bar includes at least one storage compartment formed therein.

9. A method as recited in claim 1, wherein the replacement center bar includes at least one light fixture.

10. A method as recited in claim 6, wherein the rear glass panel comprises at least one vent defined on a rear edge thereof.

11. A method as recited in claim 6, wherein said front glass panel is adapted to open by being lifted above the rear glass panel and sliding over the rear glass panel.

12. A method as recited in claim 6, wherein the mid region of the open portion in the roof is proximate a rigidifying pillar of the vehicle.

13. A method as recited in claim 12, wherein the replacement center bar is accessible from an interior of the vehicle and houses at least one of a light fitting, a storage compartment and a roller sun blind.

* * * * *